(No Model.)
H. SHLAUDEMAN.
Refrigerator Building for Fermenting and Storing Beer
No. 240,778. Patented April 26, 1881.
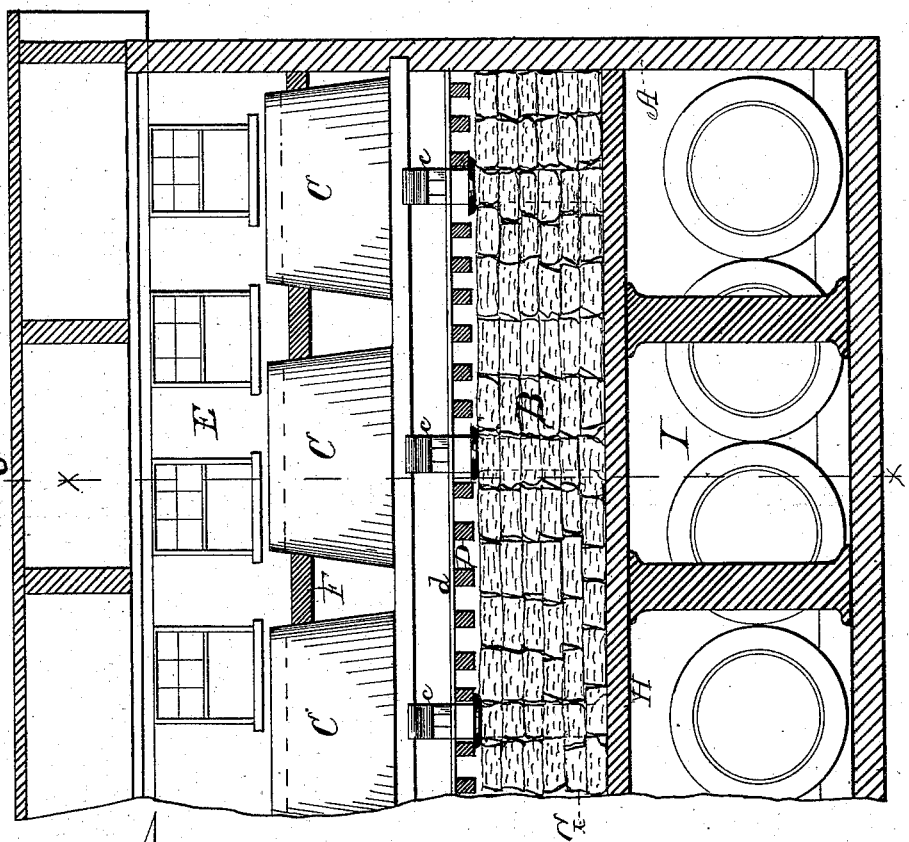
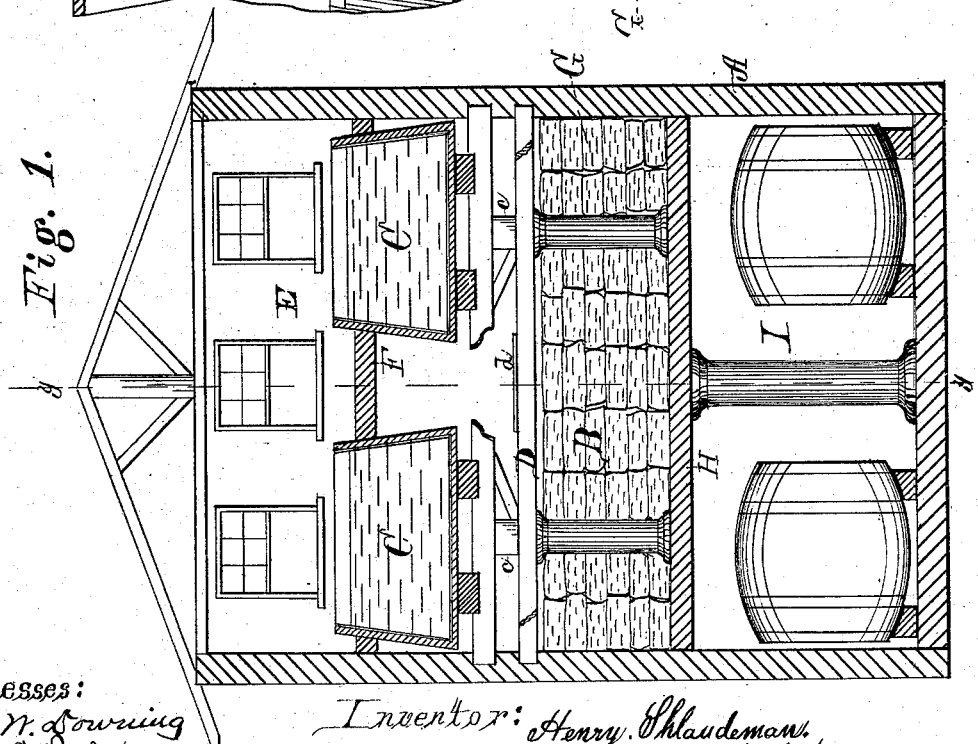
Witnesses:
Geo. W. Downing
John J. Bixby
Inventor: Henry Shlaudeman.
By John C. Dupue.
Attorney.
N. PETERS, Photo-Lithographer, Washington, D.C.

United States Patent Office.

HENRY SHLAUDEMAN, OF DECATUR, ILLINOIS.

REFRIGERATOR-BUILDING FOR FERMENTING AND STORING BEER.

SPECIFICATION forming part of Letters Patent No. 240,778, dated April 26, 1881.

Application filed October 29, 1880. (No model.)

*To all whom it may concern:*

Be it known that I, HENRY SHLAUDEMAN, a citizen of the United States, residing at Decatur, in the county of Macon and State of Illinois, have invented a new and useful Improvement in the Process of Manufacturing Beer, of which the following is a specification.

My invention relates to the construction of a refrigerator-building for fermenting and storing beer and other liquids, having its fermenting-tubs above the ice, and provided with windows for the admission of fresh air, and of an intermediate room which contains the body of ice between the fermenting-room and store-room, said ice body being facilitated for both purposes. I attain this object by the method of construction of the building illustrated in the accompanying drawings, in which—

Figure 1 is a vertical central section on the line $xx$, Fig. 2, showing the interior of the building and the arrangements therein. Fig. 2 is a vertical longitudinal section of the same on the line $yy$, Fig. 1.

Corresponding letters represent corresponding parts throughout the several views.

A represents the side walls of the building, which are constructed in the usual manner, as heretofore.

B represents the body of ice, which is placed intermediate between the store-room and fermenting-room, and below the tubs. The fermenting-tubs C are supported on trusses $c$ above the ice, the upper part of the tubs projecting through the floor of the fermenting-room or air-chamber, said floor being perfectly air-tight. The flooring shown at D, being below the tubs and a little above the ice, is formed of joists, without other covering except one or two boards, $d$, to serve as a path to walk upon between the tubs for the purpose of cleaning, &c. The tubs are supported on trusses, in order to allow the space required for a person to walk around the tubs, and also to allow the tubs to pass up through the upper floor into the air-chamber a few inches. This method secures a fresh-air chamber, free of gas, the surface of the beer in the tubs being kept cool by shallow pans filled with ice and floating thereon. The pans, being an old device, are not shown in the drawings.

E represents the air-chamber, and is provided with windows on all sides, when built to allow it; but should the building form an L to the main brewery, then three, or even two, sides may be provided with windows or openings of any kind whatsoever, so that there may be a draft of fresh air constantly passing over the top of the tubs, to expel the gas arising therefrom and to render the beer pure.

The building, as shown, may be made according to locality and capacity of brewery.

It will be seen by reference to the drawings that the ice is confined between the two floors F and H, the floor D being simply an open floor, as before described. The object of this is to utilize the ice to the greatest extent, as by its position above the store-room and below the fermenting-tubs the one body of ice acts on both.

Having thus described my improvement in brewing, what I claim, and desire to secure by Letters Patent, is—

The combination, in a refrigerator-building for brewing purposes, of the ventilated fermenting-room having the tubs protruding up through the floor a few inches, the lower part of said tubs resting on trusses in the room below above the ice, and of the ice-body placed below the fermenting-tubs and above the stock-room, as shown and described.

HENRY SHLAUDEMAN.

Witnesses:
 JOHN S. BIXBY,
 GEO. W. DOWNING.